No. 735,957. PATENTED AUG. 11, 1903.
G. F. EBERHARD.
ANIMAL TRAP.
APPLICATION FILED OCT. 9, 1902.
NO MODEL. 2 SHEETS—SHEET 1.
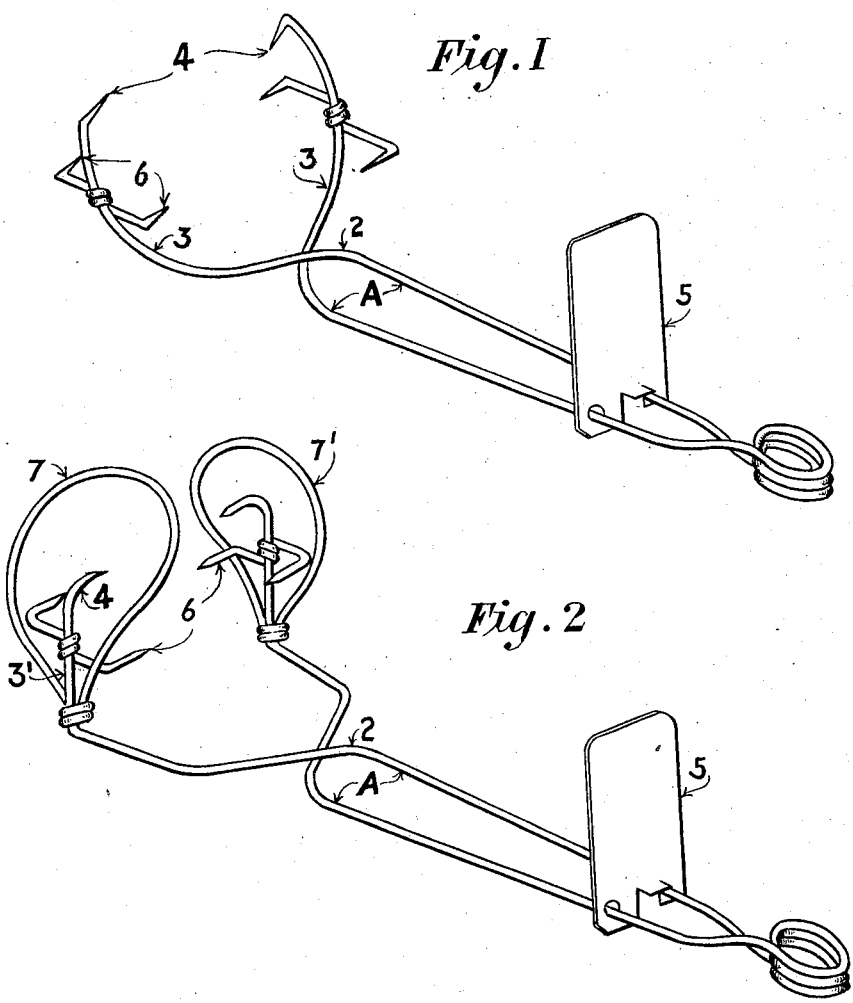

No. 735,957. PATENTED AUG. 11, 1903.
G. F. EBERHARD.
ANIMAL TRAP.
APPLICATION FILED OCT. 9, 1902.
NO MODEL. 2 SHEETS—SHEET 2.
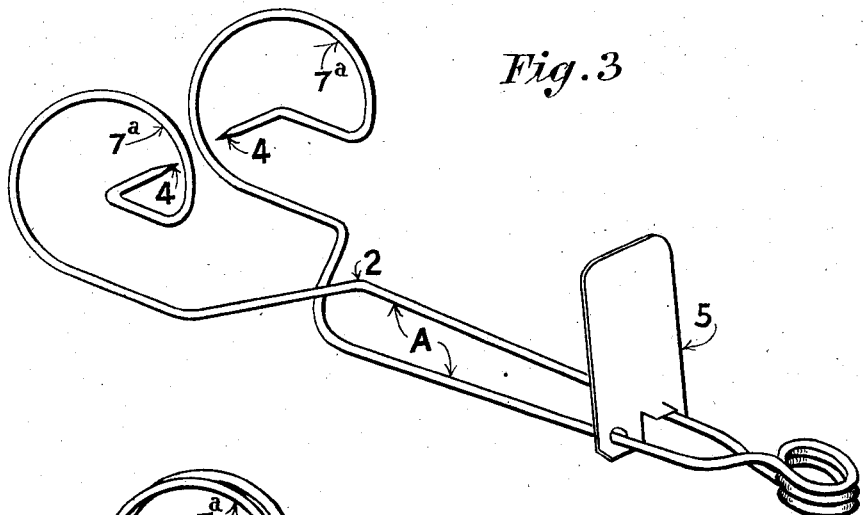
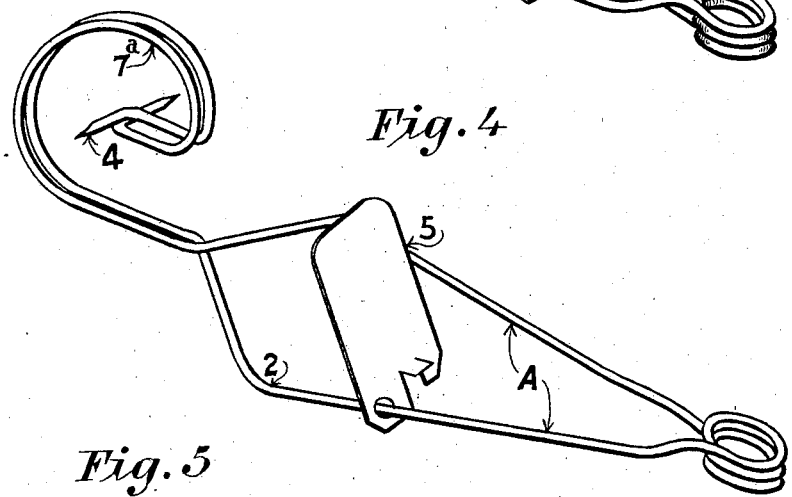
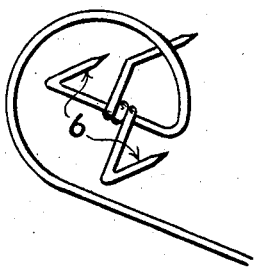
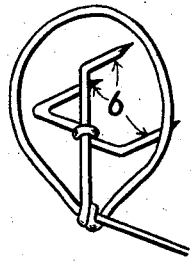
Witnesses,
Inventor,
George F. Eberhard
By Dewey Strong & Co.
Attys No. 735,957. Patented August 11, 1903.

UNITED STATES PATENT OFFICE.

GEORGE F. EBERHARD, OF SAN FRANCISCO, CALIFORNIA, ASSIGNOR TO THE GEO. F. EBERHARD COMPANY, OF SAN FRANCISCO, CALIFORNIA, A CORPORATION.

ANIMAL-TRAP.

SPECIFICATION forming part of Letters Patent No. 735,957, dated August 11, 1903.

Application filed October 9, 1902. Serial No. 126,561. (No model.)

*To all whom it may concern:*

Be it known that I, GEORGE F. EBERHARD, a citizen of the United States, residing in the city and county of San Francisco, State of California, have invented an Improvement in Animal-Traps; and I hereby declare the following to be a full, clear, and exact description of the same.

My invention relates to improvements in animal-traps of the type designed for gophers and other similar burrowing pests.

It consists of the parts and the construction and combination of parts which I will hereinafter describe and claim.

The object of my invention is to obviate the disadvantage present in ordinary traps of this general type by forming these jaws so that by no amount of "wriggling" can a gopher once in the grasp of the jaws escape. It is a well-known fact that a gopher which has once escaped from a trap or has survived his experience therewith in any way is never to be induced to approach near one again. Consequently it is necessary that in order to be rid of these pests the trap must be unfailing in its operation. Furthermore, while a gopher will survive a considerable amount of pressure in a trap the simplest penetration of his skin sufficient to draw blood, however little, will cause his death. With these two facts in view I have designed my improvements as herewith shown.

Figure 1 shows a general view of trap with quadrant jaws and plurality of teeth, the trap set. Fig. 2 shows guard-loops inclosing teeth. Figs. 3, 4, 5, and 6 show modification of form of jaws.

Having reference to the drawings, the trap is made by bending a single piece of spring-wire upon itself to form the spring-arms A. The ends of these arms are bent inwardly at approximately right angles and in the same plane with the arms, as at 2. This portion is again bent upwardly to form, approximately, quadrants 3. The ends of these quadrants are bent at approximately right angles to a tangent to the quadrants at said point of bending, and said bent portions are sharpened to form impaling-teeth 4. These teeth stand at an angle to the plane of the quadrant, so that when the jaws are sprung together these teeth will interlock.

The trap is set by pressing the arms A toward each other and locking by the trigger 5. The pressure against this trigger by the advancing gopher causes the arms to fly apart and the jaws to interlock, not only squeezing the victim, but impaling him upon the teeth.

With larger animals it is desirable at times to provide a plurality of impaling points or teeth 6, firmly secured upon the jaws and parallel with the spring-arms, as shown in Figs. 1 and 2. These teeth serve as a clamp to grasp the animal and prevent his twisting or wriggling free, or I may as a safeguard in the same direction, either in conjunction with the teeth 6 or otherwise, provide the guard frames or loops 7 and 7', as in Fig. 2. These loops are firmly secured to the spring-arms or may be twisted from the same piece of wire, according to convenience and economy of construction. These loops are segmentally curved approximately in the same plane with the jaws 3', which they inclose, and the one, as 7', is smaller than the other to permit its passing into the space of and through the loop 7 as the trap is sprung. The jaw portions are quadrant-shaped and toothed, as in the first form of device described.

Fig. 3 shows another form of my device, in which the loops 7ª stand substantially parallel to each other and have the impaling-teeth 4.

Having thus described my invention, what I claim as new, and desire to secure by Letters Patent, is—

1. The combination in an animal-trap of a wire bent upon itself to form spring-arms, the ends of these arms terminating in oppositely-curved jaws adapted to interlock, and provided with impaling-teeth, of segmental-shaped loops upon said arms inclosing and approximately in the same plane with said jaws, said loops adapted to interlock each other when the trap is sprung, and a trigger whereby said arms are held in a compressed position.

2. In an animal-trap the combination with spring-actuated jaws and a trigger mechanism, of segmental-shaped loops upon said jaws inclosing and approximately in the same plane with the jaws, and adapted to interlock with each other when the trap is sprung.

In witness whereof I have hereunto set my hand.

GEORGE F. EBERHARD.

Witnesses:
D. B. RICHARDS,
S. A. STRITE.